United States Patent [19]

Brint et al.

[11] Patent Number: 4,876,712
[45] Date of Patent: Oct. 24, 1989

[54] PROGRAMMABLE TELEPHONE AMPLIFIER CIRCUIT INTERFACE

[75] Inventors: Gary T. Brint, Scotts Valley; Gabriele Bungardt, Santa Cruz; Jerel C. Gedecke, San Jose; Robert L. Harris, Aptos; Vladimir Kraz, Santa Cruz, all of Calif.

[73] Assignee: Electronics, Inc., Santa Cruz, Calif.

[21] Appl. No.: 282,278

[22] Filed: Dec. 9, 1988

[51] Int. Cl.⁴ .............................................. H04M 1/62
[52] U.S. Cl. ..................................... 379/387; 379/390; 439/151
[58] Field of Search ............... 379/387, 390, 395, 430; 439/151, 172, 174

[56] References Cited

U.S. PATENT DOCUMENTS 3,396,358  6/1968  Ballard et al. ...................... 439/172

Primary Examiner—Stafford D. Schreyer
Attorney, Agent, or Firm—Arnold, White & Durkee

[57] ABSTRACT

A telephone headset is connected to a telephone line through a interface module having programmable signal conditioning characteristics. The interface module is universal in that it can be programmed for use with many different headset or handset units. The interface module is automatically programmed through a multipin connector carried on the headset or handset connecting cable. The pin arrangement in the connector when plugged into a mating receptacle connector of the interface module produces binary input signals which can be decoded into programming signals for the signal conditioning circuit in the module.

10 Claims, 3 Drawing Sheets

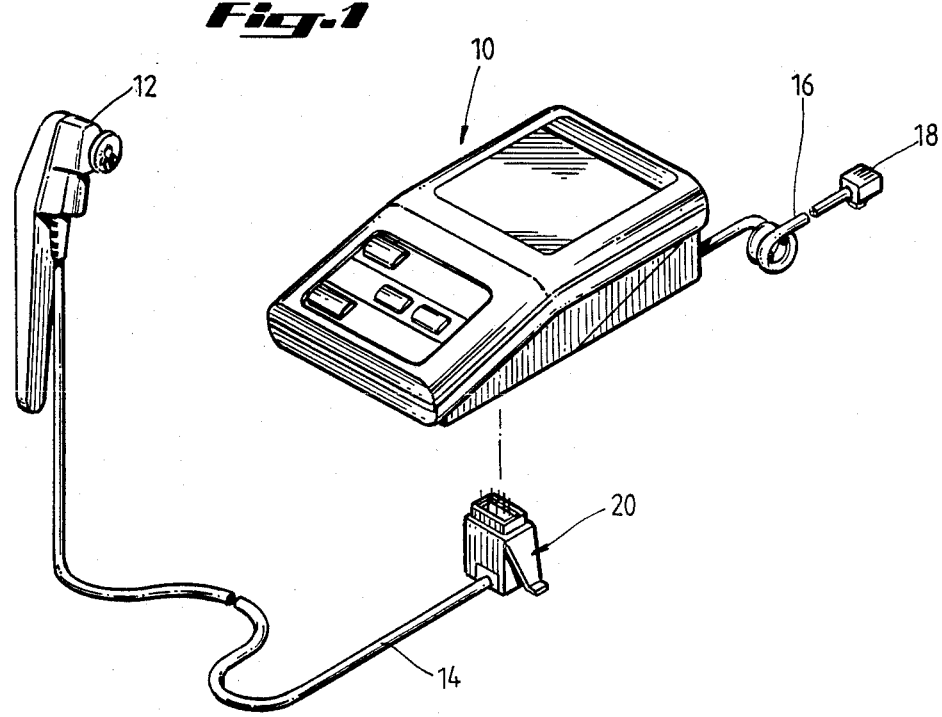
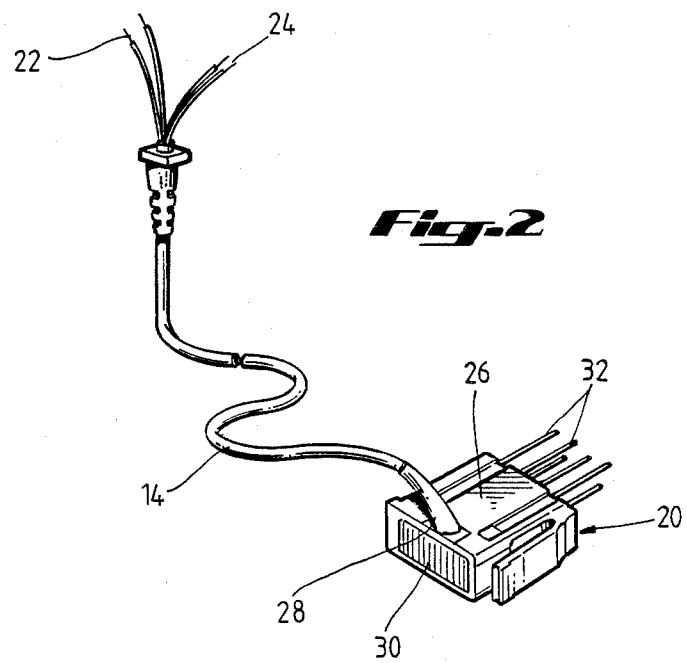

PROGRAMMABLE TELEPHONE AMPLIFIER CIRCUIT INTERFACE

FIELD OF THE INVENTION

This invention relates to two-way, transmit and receive, voice communication over a wired interconnection to a communication link such as a telephone line. More particularly, the present invention relates to apparatus for interfacing a two-way voice communication instrument to the communication link and providing selectable conditioning of voice signals being passed therebetween appropriate for the instrument.

BACKGROUND OF THE INVENTION

A two-way voice communication instrument, such as a telephone handset or headset, must be interfaced to the telephone line communication link. Communication interface apparatus typically includes amplifier circuitry to provide voice signal conditioning. However, there are variations in the voice communication characteristics of the instruments, which require different signal conditioning by the interface apparatus. Heretofore, different interface apparatus has been required in order to provide appropriate signal conditioning for a particular voice communication instrument. The present invention provides a single interface apparatus that is compatible with a broad range of voice communication instruments.

SUMMARY OF THE INVENTION

The present invention provides a universal interface for, for example, a telephone headset to a telephone line. Telephone line interfaces for headsets, handsets and other types of voice communication instruments which provide signal conditioning such as amplification, frequency response shaping, and compression are configured for the transmit and receive characteristics of a particular instrument. With programmable signal conditioning circuitry, the interface can be programmed according to the characteristics of the instrument to provide the appropriate signal conditioning.

In accordance with the present invention, programming signals are produced to automatically program the signal conditioning circuit based upon the configuration of a connector which completes a wired interconnection of the headset to the interface. The connector is a multi-pin connector which is configured differently according to the type of headset so as to produce different programming signals and, thus, different programming of the signal conditioning circuit.

Further in accordance with a particular implementation of the present invention, the multi-pin connector carried by the communication instrument has a grounding plate. Certain pins (or no pins at all) are connected to the grounding plate to establish a pin configuration which can be detected. The programming pins can be used individually to produce programming signals, or they can be used collectively as a group to produce a binary code which is decoded into several programming signals.

The connector also includes pins which serve as conductors for transmit and receive signals passing between the voice instrument and the interface. One of these conductor pins is dedicated as a shielded, ground conductor. This ground pin is connected to the grounding plate to provide the ground potential.

BRIEF DESCRIPTION OF THE DRAWINGS

A written description setting forth the best mode presently known for carrying out the present invention, and of the manner of implementing and using it, is provided by the following detailed description which references the attached drawings, wherein:

FIG. 1 is a perspective illustration of an interface module in accordance with the present invention together with a voice communication headset instrument;

FIG. 2 is an illustration of the cable plug connector portion carried by the headset shown in FIG. 1;

DETAILED DESCRIPTION OF AN ILLUSTRATIVE EMBODIMENT

Figure 3:
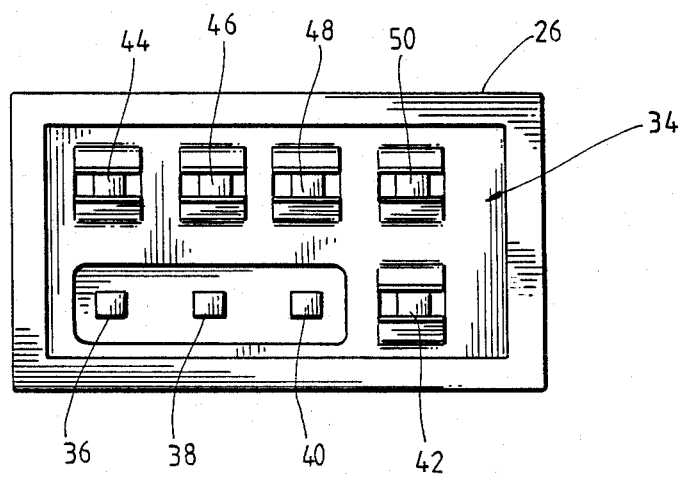
FIG. 3 is a top view illustration of the housing of the plug connector portion carried by the headset cable and for mating engagement with the receptacle connector portion on the interface module.

Referring first to FIG. 1, interface apparatus 10 and a two-way voice communication instrument in the form of headset 12 are indicated. Interface module 10 interfaces headset 12 to a communicational link, such as a telephone line. Interconnection between headset 12 and interface module 10 is by a wire connection such as cable 14. Interface module 12 in turn is connectable to the telephone line by a wire connection in the form of cable 16. A conventional modular connector 18 provides a termination for cable 16, which is compatible with a modular receptacle as is typically found in a wall installation. Cable 14 carried by headset 12 terminates in a plug connector portion at 20 having a plurality of electrical contact elements or pins. Plug connector portion 20 is adapted for mating engagement with a receptacle connector portion carried on the underside of the housing of interface module 10. The receptacle connector portion (not shown) includes a plurality of electrical contact elements in the form of apertures adapted to receive the pin contact elements of plug connector portion 20.

Referring to FIG. 2, headset cable 14 and plug connector portion 20 are shown apart from headset 12. As indicated, cable 14 is a four conductor cable having a first pair of conductors 22 and a second pair of conductors 24. The first pair of conductors 22 provides electrical connection to the microphone transducer in headset 12. Similarly, conductor pair 24 provides electrical connection to the receiver transducer in headset 12. Conductor pair 22 provides four wire connection to the transmit channel of interface module 10, and conductor pair 24 provides a wire connection to the receive channel of interface module 10.

Plug connector portion 20 includes a housing 26. The end 28 of headset cable 14 is received within housing 26 at the backside 30. Extending from the front side of 26 are the electrical contact pin elements 32.

Headset 12 is but an illustrative two-way voice communication instrument. A handset may suitably be utilized with the present invention. Headset 12 is a miniaturized headset in accordance with that shown in U.S. Pat. No. 4,720,857 issued Jan. 19, 1988, to Plantronics, Inc., which patent is hereby incorporated by reference.

Interface module 10 includes a signal conditioning circuit having a transmit signal channel and a receive signal channel. One such signal conditioning circuit is that of U.S. Pat. No. 4,536,888 issued Aug. 20, 1988, to Plantronics, Inc., which patent is hereby incorporated by reference. Preferably, however, interface module 10 includes a signal conditioning circuit in accordance with that described in pending U.S. application Ser. No. 139,853 filed Dec. 30, 1987 by Plantronics, Inc., which application is hereby incorporated by reference. The signal conditioning circuitry may provide transmit signal conditioning, including amplification of the headset microphone signal. Transmit signal conditioning may also involve frequency shaping, voice switching to suppress background noise, or put signal amplitude adjustment. Receive channel signal conditioning may involve linear compression limiting as a function of amplitude and/or frequency and automatic received signal volume control adjustment. The various signal conditioning functions are generally referred to herein as "signal conditioning characteristics" of the transmit and receive signal channels of the interface module. The signal conditioning characteristics of the signal channels in the interface module are programmable by an electrical input signal. For example, the signal conditioning circuit of U.S. application Ser. No. 139,853 includes a programmable gain stage in the transmit signal channel to amplify low-level input signals. The gain is programmable to four levels of amplification corresponding to the four different states of two binary electrical input signals. The frequency shaping characteristics of the transmit signal channel are also programmable based on two binary inputs. Further, volume control adjustment of the transmit signal channel output is programmable. Although the volume control adjustment will typically be user controlled, the gain stage and frequency shaping characteristics will be dependent upon the particular voice communication instrument being utilized.

The receive signal channel in the signal conditioning circuit of U.S. application Ser. No. 139,853 includes frequency response shaping in either of two programmable configurations, based upon the state of a binary control input. Programmable volume control is also provided based upon two binary electrical input signals. Finally, the output level available from the receive signal channel is controlled a programmable gain stage which receives a binary input signal.

Accordingly, based upon electrical input signals, particularly with one or more signals in the form of binary inputs to the circuitry, the signal conditioning characteristics of a signal conditioning circuit in the interface module may be programmed to desired settings. Further, the desired settings of the signal conditioning circuit will be to those which are appropriate for a particular voice communication instrument.

In accordance with the present invention, identification of a particular voice communication instrument and establishment of the required electrical input signals to program the signal conditioning circuit in the interface module is provided by the configuration of the connector 20 which is associated with the voice communication instrument 12. Briefly, plug connector portion 20 includes, for example, eight electrical contact pin elements. Only four of the electrical pin elements are required for the conductor pairs 22 and 24 of the transmit and receive signal channels. Further, one of the four conductors is a ground shield. The remaining connector contact elements are used for establishing electrical input signals programming the signal conditioning circuit. Depending upon the desired number of electrical input programming signals and the particular decoding scheme desired, the four contact pin elements can provide a number of different programmable signals on the basis of a binary decoding scheme, the states of the four electrical contact pin elements can be decoded into as many as 16 possible combinations.

Referring to FIG. 3, a schematic top view of connector 20 is illustrated. Set into the face of housing 26 is a grounding plate 34 having a first set of electrical contact elements 36, 38 and 40 corresponding to conductors 22 and 24 of headset cable 14. These contact pin elements are not connected to grounding plate 34. A contact pin element 42 is connected with the shield wire in cable 14. The grounded condition of the shield wire in turn grounds plate 34. A second set of four electrical contact pin elements 44, 46, 48 and 50 are utilized to provide the electrical input signals for programming the signal conditioning circuit. Each of these pin elements, if present, is grounded by virtue of its electrical interconnection with grounding plate 34. Accordingly, the presence or absence of the one or more of the pins of the second set of contacts in connector 20 provides a binary combination of up to 16 possible combinations.

Figure 4A:
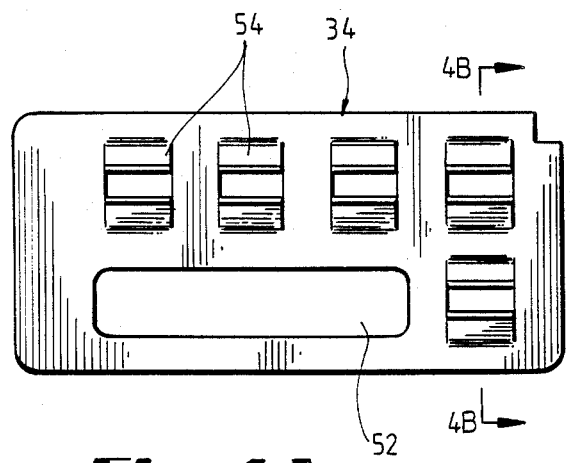
FIGS. 4A and 4B illustrates a grounding plate used in the plug connector portion shown in FIG. 3.
Figure 4B:
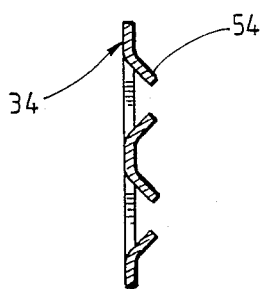
Figure 5:
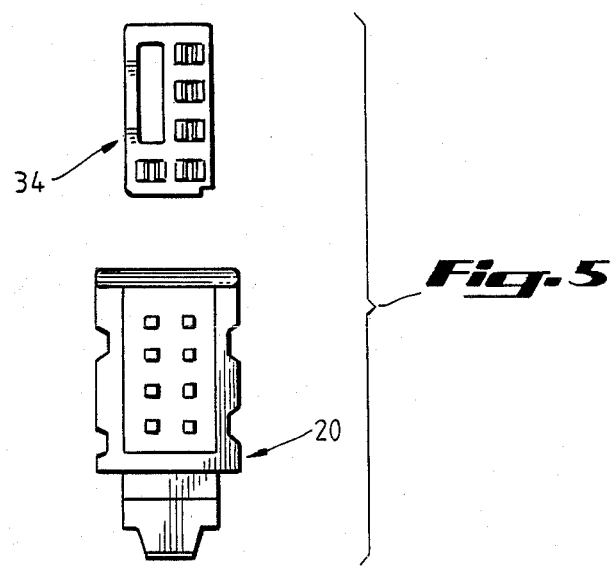
FIG. 5 illustrates the plug connector housing and the installation of the grounding plate therein.
Figure 6:
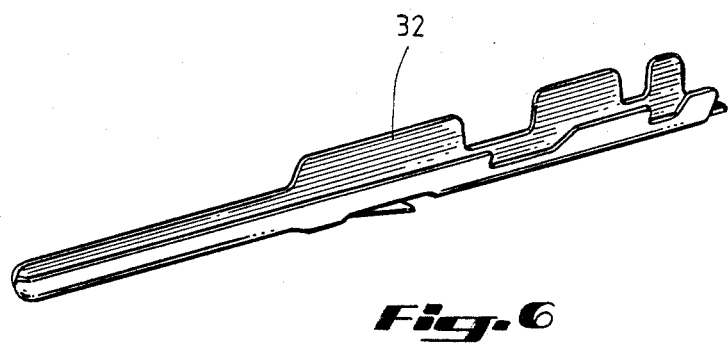
FIG. 6 illustrates a connector crimp pin for use in the plug connector portion.

Referring to FIGS. 4A and 4B, grounding plate 34 is shown in greater detail. The grounding plate includes an open segment 52 in approximately the area where headset wire connection contacts 36, 38 and 40 are located. The remaining areas of electrical pin contact location have a flared aperture configuration as shown at reference numeral 54 in FIG. 4B. Referring to FIG. 5, installation of grounding plate 34 in housing 26 is illustrated. As shown, grounding plate 34 is installed before insertion of pins into the connector by sliding the plate into a recessed area formed within housing 26. In FIG. 6, a pre-installed connector crimp pin is illustrated. After installation of grounding plate 34 and housing 26 in the manner shown in FIG. 5, the appropriate ones of the electrical contact pin elements 32 are inserted in the connector housing.

The foregoing description of the invention has been directed an illustrative embodiment for purposes of explanation and illustration. It will be apparent, however, to those skilled in this art that many modifications and changes in the apparatus may be made without departing from the scope of the invention. It is the applicants intention that the following claims cover all equivalent modifications and variations as followed within the scope of the invention.

What is claimed is:

1. Apparatus for interfacing a two-way voice communication instrument to a communication link, comprising:

a signal conditioning circuit having a transmit signal channel and a receive signal channel, the circuit being programmable by an electrical input signal to establish a signal conditioning characteristic of at least one of the channels;

a first wire connection adapted to couple the signal conditioning circuit to a telephone link;

a second wire connection adapted to couple the signal conditioning circuit to a voice communication instrument;

a connector coupled in the second wire connection between the signal conditioning circuit and a voice communication instrument; and means carried by the connector for providing the electrical input signal to program the signal conditioning circuit.

2. The apparatus of claim 1 wherein the connector includes first and second mating connector portions, each connector portion having electrical contact elements adapted to engage corresponding electrical contact elements in the other connector portion.

3. The apparatus of claim 2 wherein the electrical contact elements in the first connector portion are elongated pins and the electrical contact elements in the second connector portion are contact pin receptacles.

4. The apparatus of claim 1 wherein the programming means comprises at least one electrical contact element in the connector which is connectable to an electrical potential.

5. The apparatus of claim 1 wherein the connector includes first and second mating portions the first portion having a plate connectable to an electrical potential and a plurality of electrical contact elements, a first group of the contact elements being adapted to carry transmit and receive channel signals and a second group of the contact elements being coupled to the plate to provide electrical input programming signals.

6. The apparatus of claim 5 wherein one of the first group of contact elements is electrically connected to the plate and is connectable to ground potential.

7. Apparatus for interfacing a two-way voice communication instrument to a communication link, comprising:
    a signal conditioning circuit programmable to provide a selected signal conditioning characteristic to an electrical voice signal being passed between a voice communication instrument and a communication link;
    a connector receptacle coupled to the signal conditioning circuit and having electrical contact elements;
    a connector plug to be coupled to a voice communication instrument and to be mated with the connector receptacle, the connector plug having electrical contact elements to engage contact elements in the connector receptacle; and
    means carried by the connector plug for programming the signal conditioning circuit.

8. The apparatus of claim 7 wherein said programming means comprises:
    at least one electrical contact element in the connector plug which is connectable to an electrical potential to provide a programming signal for the signal conditioning circuit when the connector plug is mated with the connector receptacle.

9. The apparatus of claim 7 wherein said programming means comprises:
    a grounding plate having one or more electrical contact elements of the connector plug connected thereto and being connectable to an electrical potential,
    the electrical contact elements of the connector plug connected to the grounding plate providing one or more programming signals for the signal conditioning circuit when the connector plug is mated with the connector receptacle.

10. A two-way voice communication system for coupling to a communication link, comprising:
    a voice communication instrument including a microphone, for producing electrical voice signals, and a receive transducer, for converting received electrical voice signals to audible sound;
    an interface module including a signal conditioning circuit having a transmit signal channel and a receive signal channel, the circuit being programmable to selectively establish signal conditioning characteristics of at least one of the channels;
    a first wired connection adapted to couple the transmit and receive signal channels to a communication link;
    a second wired connection coupling the transmit signal channel to the microphone and coupling the receive channel to the receive transducer;
    a connector interposed in the second wire connection having mating electrical contact elements, a first group of the contact elements providing coupling of the transmit and receive channels to the microphone and receive transducer and a second group of the contact elements being connected to a potential to provide electrical input signals to program the signal conditioning circuit.

* * * * *

UNITED STATES PATENT AND TRADEMARK OFFICE
CERTIFICATE OF CORRECTION

PATENT NO. : 4,876,712
DATED : October 24, 1989
INVENTOR(S) : Brint et al

It is certified that error appears in the above-identified patent and that said Letters Patent is hereby corrected as shown below:

On the title page assignee should read

--(73)Assignee: Plantronics, Inc. --.

Signed and Sealed this

Ninth Day of October, 1990

Attest:

HARRY F. MANBECK, JR.

*Attesting Officer*  *Commissioner of Patents and Trademarks*